United States Patent [19]

Rubin et al.

[11] Patent Number: 5,359,330
[45] Date of Patent: * Oct. 25, 1994

[54] MICROBURST PRECURSOR DETECTION UTILIZING MICROWAVE RADAR

[75] Inventors: Willian L. Rubin, Whitestone; Carl H. Leyh, Floral Park, both of N.Y.

[73] Assignee: Unisys Corporation, Great Neck, N.Y.

[*] Notice: The portion of the term of this patent subsequent to Jul. 24, 2009 has been disclaimed.

[21] Appl. No.: 99,030

[22] Filed: Jul. 29, 1993

Related U.S. Application Data

[63] Continuation of Ser. No. 882,394, May 13, 1992, Pat. No. 5,262,782, which is a continuation of Ser. No. 683,356, Apr. 9, 1991, Pat. No. 5,130,712.

[51] Int. Cl.⁵ .................... G01S 13/64; G01S 13/95
[52] U.S. Cl. .................... 342/26; 342/460; 340/949; 340/968
[58] Field of Search ............. 342/26, 460; 340/949, 340/968, 601

[56] References Cited

U.S. PATENT DOCUMENTS

| | | | |
|---|---|---|---|
| 5,077,558 | 12/1991 | Kuntman | 342/26 |
| 5,117,359 | 5/1992 | Eccles | 364/420 |
| 5,130,712 | 7/1992 | Rubin et al. | 342/26 |
| 5,175,551 | 12/1992 | Rubin | 342/26 |
| 5,208,587 | 5/1993 | Cornman | 340/968 |
| 5,208,600 | 5/1993 | Rubin | 342/26 |
| 5,221,924 | 6/1993 | Wilson, Jr. | 340/968 |
| 5,262,782 | 11/1993 | Rubin et al. | 342/26 |

OTHER PUBLICATIONS

J. Evans, et al "Development of an Automated Windshear Detection System Using Doppler Weather Radar" –Proceedings of the IEEE, vol. 77 No. 11 Nov. 1989.

*Primary Examiner*—John B. Sotomayor
*Attorney, Agent, or Firm*—Seymour Levine; Mark T. Starr; Stanton D. Weinstein

[57] ABSTRACT

A microburst precursor detector samples radar returns from meteorological radar signal reflectors and processes the signal returns in a statistical manner to determine average radar reflectivity and to extract Doppler signal parameters. The vertical velocity in still air and the vertical velocity of the meteorological radar reflectors are respectively determined from the average reflectivity and the Doppler signal parameters. The difference between the two vertical velocities is taken to determine the vertical wind velocity. The vertical wind velocity and the average reflectivity are processed to predict the occurrence of a microburst.

13 Claims, 10 Drawing Sheets

MICROBURST PRECURSOR DETECTION UTILIZING MICROWAVE RADAR

This application is a continuation of application number 7/882,394, filed May 13, 1992, now U.S. Pat. No. 5,262,782, which in turn is a continuation of application number 07/683,356 filed Apr. 9, 1991, now U.S. Pat. No. 5,130,712.

BACKGROUND OF THE INVENTION

1. Field of the Invention

The present invention relates generally to the prediction of weather disturbances and, more particularly, to the prediction of weather disturbances that give rise to microburst wind shear conditions at low altitudes over the earth's surface which are hazardous to aircraft during takeoff and landing.

2. Description of the Prior Art

Microburst wind shear is a weather condition which denotes significantly different wind velocities and directions occurring simultaneously at low altitudes over a relatively small region. A microburst wind shear typically lasts 5 to 15 minutes, occurs over a relatively small area, and is extremely hazardous during aircraft takeoffs and landings. Systems of the prior art generally detect microburst ground level wind shear after initial occurrence. In many landing and takeoff situations, these systems do not provide sufficient warning time to permit the avoidance of a wind shear area by aircraft taking off and landing, having provided the danger signal after the onset of the wind shear condition.

One method of the prior art for detecting surface wind shear conditions employs ground observations of wind direction and magnitude using mechanical wind sensors at a plurality of locations about an airport. This system has been proven to be inadequate since serious accidents have occurred at airports whereat such systems have been employed due to the untimely or missed detection of the wind shear conditions. A second method utilizes ground based radar. Ground based weather sensing radars typically have narrow antenna beams to enhance moist air detectability and provide high angular resolution. A Terminal Doppler Weather Radar, presently in development, is intended to detect a surface microburst wind shear at an airport, as it develops, from a location about 20 Km from the airport. Because of geometric considerations, its doppler measurement capability is limited to detecting the horizontal movement of hydrometers (rain drops) above the earth's surface. It measures wind shear when there are a sufficient number of entrained rain drops to provide a detectable radar echo return. It can also measure horizontal movement of moisture laden winds aloft which provides indirect evidence of the presence of surface microburst wind shear precursors under some weather conditions. The probability of microburst precursor detection in this mode is not high and the false alarm rate, based only on these measurements, will likely be unacceptably high.

Other methods of the prior art utilize on-board apparatus for detecting the aircraft ground speed and comparing this ground speed to the airspeed of the aircraft. The difference in speeds and the vertical aircraft acceleration, determined by inertial sensors, provide an indication of the wind conditions about the aircraft. Such systems do not provide timely indications of wind conditions ahead and, in particular, do not provide advance warning of microburst wind shear ahead of the aircraft. Other prior art on-board wind shear detectors provide improved wind shear detection with utilization of data provided by the on-board vertical accelerometers, true airspeed indicator, pitch angle indicator, and angle of attack indicator to determine the rate of change of vertical wind and thus provide another wind shear indicator.

Systems which provide improved surface microburst wind shear detection with ground based equipment are disclosed in U.S. Pat. Nos. 4,649,388 (Re. 33,152) and 4,712,108. The invention disclosed in the former patent utilizes a doppler radar system with at least two vertically stacked radar beams which estimates the surface wind speed doppler spectrum of moisture laden air in in each vertically stacked radar beam. If the horizontal wind velocity increases (or decreases) monotonically with altitude, the spectral components of wind velocity below (above) the point where the two spectra are equal are associated with wind velocities which occur below (above) the elevation angle where the two stacked beam patterns cross over. These wind speed spectral components provide an estimate of the radial doppler velocity resulting from horizontal wind shear as a function of range and azimuth, thus permitting the detection of the wind shear location and its magnitude. The invention of the latter patent provides surface microburst wind shear detection by processing horizontal doppler radar return signals of moisture laden air after the wind shear has occurred. By tracking the microburst wind shear center in range and azimuth as a function of time, the system determines the horizontal motion of the microburst wind shear centroid, thereby predicting the microburst wind shear location during its brief lifetime.

Though these systems may predict the future location of surface microburst wind shear by tracking a microburst after its initial occurrence, they do not have the capability, however, of predicting the initial microburst wind shear occurrence. Prediction of the future position of a microburst after its occurrence does not provide a warning of wind shear conditions to an airport at the initial microburst wind shear location. Another limitation of such doppler radar sensors is their inability to detect surface microburst wind shear in the presence of very little entrained moisture content, a phenomenon which occurs very often-in the western part of the United States.

What is required is a system which reliably predicts the location of initial surface microburst wind shear with sufficient lead time for safely rerouting an aircraft about to land or delaying such landing and takeoffs of aircraft at that location and will perform this function even when there is little moisture in the entrained wind shear airflow.

SUMMARY OF THE INVENTION

It is an objective of this invention to provide adequate early warning of a surface microburst wind shear by determining a vertical wind downdraft 1-3 Km in diameter which precedes the occurrence of surface wind shear by 5 to 15 minutes. The vertical downdraft fans out horizontally in all directions when it reaches the ground to generate circular or elliptically shaped microburst wind shear. This objective is accomplished by detecting the vertical wind downdraft during its descent before it reaches ground level and generates horizontal wind shear. Determination of the vertical wind downdraft is accomplished by extracting four weather parameters from received signals of a scanning single beam or vertically stacked multiple beam microwave doppler radar system which illuminates a preselected altitude range for a predetermined distance about an airport. The number of beams of the doppler radar system and their beamwidths are designed to provide coverage over the preselected altitude range in the predetermined region around the airport in a manner that establishes a vertical or horizontal limit for each range cell of the doppler radar system for all slant ranges that are less than a predetermined distance. This horizontal limit is selected to insure that a vertical wind downdraft column completely fills the beam, while the vertical limit restricts the effects of wind velocity gradients within a range cell. The extracted doppler signal weather parameters are utilized to establish hydrometer (precipitation) vertical velocity, horizontal velocity, and spatial location. These velocity estimates are based on the determination of the mean velocity, spectral width and skewness of the precipitation doppler velocity spectrum in each range-azimuth cell, radar determined precipitation reflectivity in each range azimuth cell from which the radar signal is returned, the azimuthal direction of the beam, and the radar beam elevation angle and beamwidth. Meteorological characteristics of storm generated microburst precursors are: a vertical wind downdraft velocity of at least five meters per second, a vertical wind downdraft column between 1.5 and 3.0 kilometers in diameter, and an increase in precipitation reflectivity within the vertical wind downdraft of 0-20 dB over that of the surrounding regions. All of these criteria are utilized to confirm that a microburst generating downdraft has been initiated.

The received doppler velocity spectrum is the result of combining the doppler radar determined radial component of vertical rain drop velocity, which is a function of the sine of the elevation angle, with the radial component of horizontal rain drop velocity, which is a function of the cosine of the elevation angle, over a relatively wide vertical antenna beamwidth. The resulting velocity spectrum is unique for each combination of average vertical and horizontal hydrometer velocities within each range-azimuth cell. The measured doppler spectrum parameters in each range-azimuth cell in each beam within the illuminated altitude region are stored on successive radar scans to establish a four dimensional parameter map. The doppler spectral parameters include mean doppler velocity, doppler spectrum width, doppler spectrum asymmetry and total spectral power in the radar echo. These measured parameters of hydrometers immersed in a microburst downdraft provide the basic information from which microburst precursor vertical and horizontal wind velocity can be estimated. When it is determined from these maps that a vertical wind column of between 1.5 and 3.0 kilometers having a vertical wind velocity which exceeds five meters per second and exhibiting a precipitation reflectivity that is 0-20 dB above the surrounding areas has been detected, a microburst warning is generated. Since the time for the vertical downdraft to descend to the earth's surface is on the order of five minutes, this warning will precede the actual occurrence of surface microburst wind shear by a time that is adequate to divert landing aircraft or to delay an aircraft takeoff.

DESCRIPTION OF THE PREFERRED EMBODIMENTS

A major cause of aircraft landing/take-off accidents is a particular form of wind shear, referred to as a microburst. The term microburst, coined to connote an aviation hazard, is a powerful downward blast of moist air which causes a violent horizontal burst of air in all directions near-ground level. This violent horizontal burst creates a horizontal wind velocity differential across its center. A microburst is said to have occurred when this wind shear is greater than or equal to 10 meters per second across a surface region approximately 4 Km in diameter below 500 meters above ground level (AGL). At low altitudes ground radar detection of wind shear is limited by ground returns known as clutter and by the fact that in many cases much of the (radar echo producing) moisture in the downdraft evaporates before it reaches the ground. Typical clutter levels and airport surveillance radar antenna rotation rates at urban airports limit wind shear detection to microbursts having precipitation reflectivities in the order of 10-20 dBz or greater. If clutter were not present, or attenuated when feasible through signal processing means, noise limitations determine detectable signal levels and an order of magnitude increase in sensitivity would be realized. The degree that clutter can be attenuated through signal filtering is dependent on antenna rotation rates and azimuth beamwidth. More rapid antenna rotation or narrower antenna beamwidths produce higher levels of modulation of ground clutter making it more difficult to reduce clutter through input signal filtering. Two types of microbursts are known: dry and wet. Dry microbursts generally occur in dry climates whereat heavy rain aloft, which initiates the events that cause severe ground wind shear conditions, mostly evaporates before reaching the ground. Dry microburst wind shear, due to the low level of entrained moisture at the ground level, exhibit reflectivities well below 20 dBz. Wet microburst wind shear generally occurs in regions of heavy rain and only partially evaporates before reaching the ground. Such microburst wind shear normally exhibit reflectivities well in excess of the 20 dBz level. Thus ground clutter inhibits the detection of dry microburst wind shear as well as wet microburst wind shear by radar systems operating with near ground level radar beams.

Figure 1:
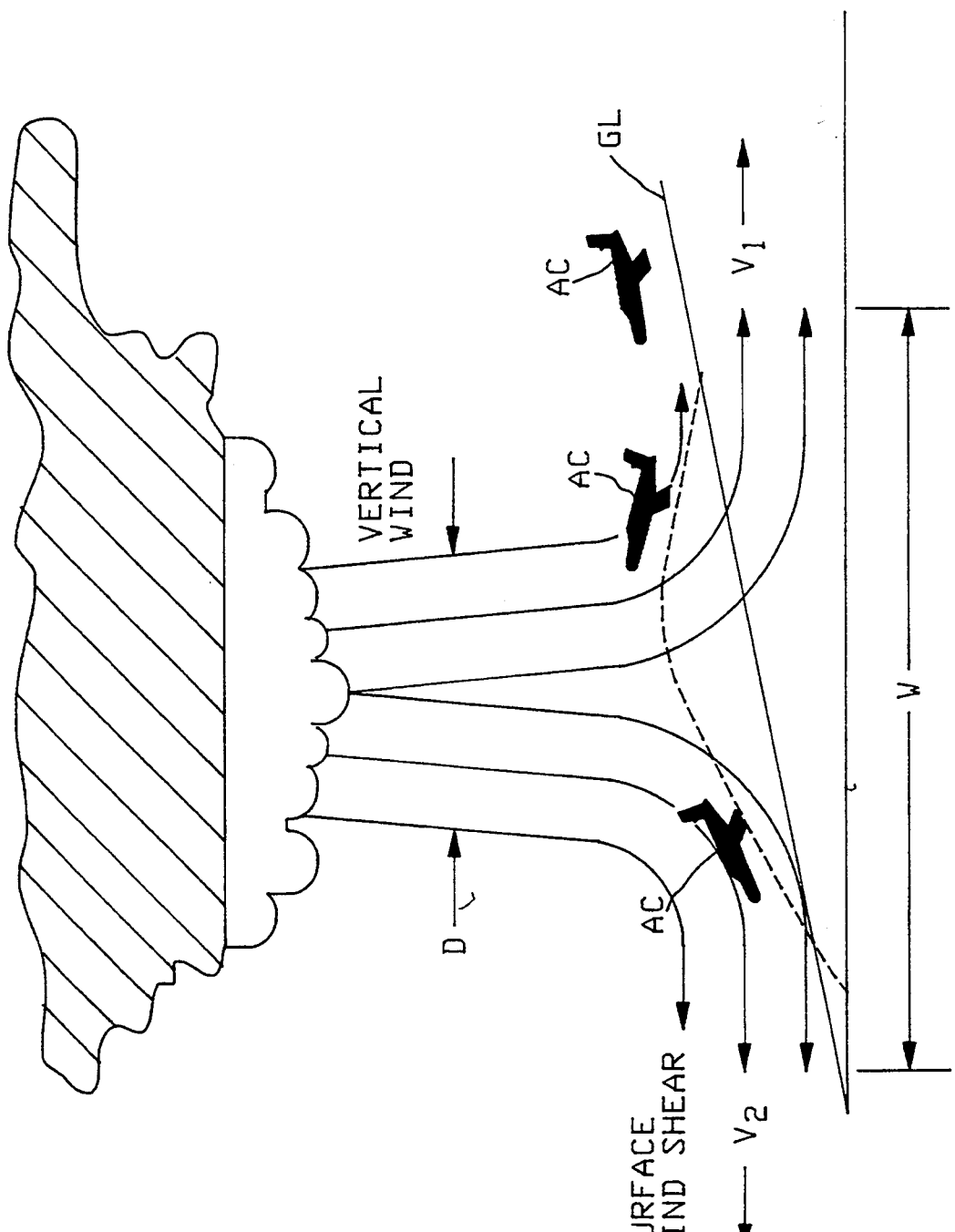
FIG. 1 is a diagram which is useful for explaining weather conditions that give rise to a microburst and the establishment of wind shear conditions.

Refer now to FIG. 1. A microburst is caused by a strong vertical downdraft, having a horizontal diameter D that is between 1.5 and 3 kilometers, which originates at high altitudes. The disturbance diameter increases as the downdraft approaches the earth's surface and establishes a horizontal wind velocity differential V=V2−(−V1) near the surface, that is at least 10 meters per second (20 kts) and may be between 60 kts and 100 kts, over a distance W of at most 4 Km. (When W is greater than 4 Km, a macroburst is said to have occurred, a condition which is less dangerous for aircraft landing or taking off.) Although a downdraft is one of several meteorologically detectable phenomena, which are collectively referred to as microburst precursors, the downdraft is the least unambiguous precursor of follow-on surface microburst wind shear.

Landing aircraft AC entering a microburst wind shear region first experiences an increase in head wind which causes the aircraft AC to fly above the glide slope GL. The pilot may attempt to return to the glide slope GL by reducing air speed and angle of attack. As the aircraft AC continues through the microburst, it encounters a strong downdraft which forces it downward while it moves horizontally and then a tail wind resulting in a loss of lift. As the aircraft AC falls beneath the glide slope GL, the pilot must now increase power and angle of attack to bring the aircraft AC back to the glide slope GL. Since the aircraft requires a finite time to respond to the control commands, a crash may occur when it is too close to the ground to recover.

Figure 2:
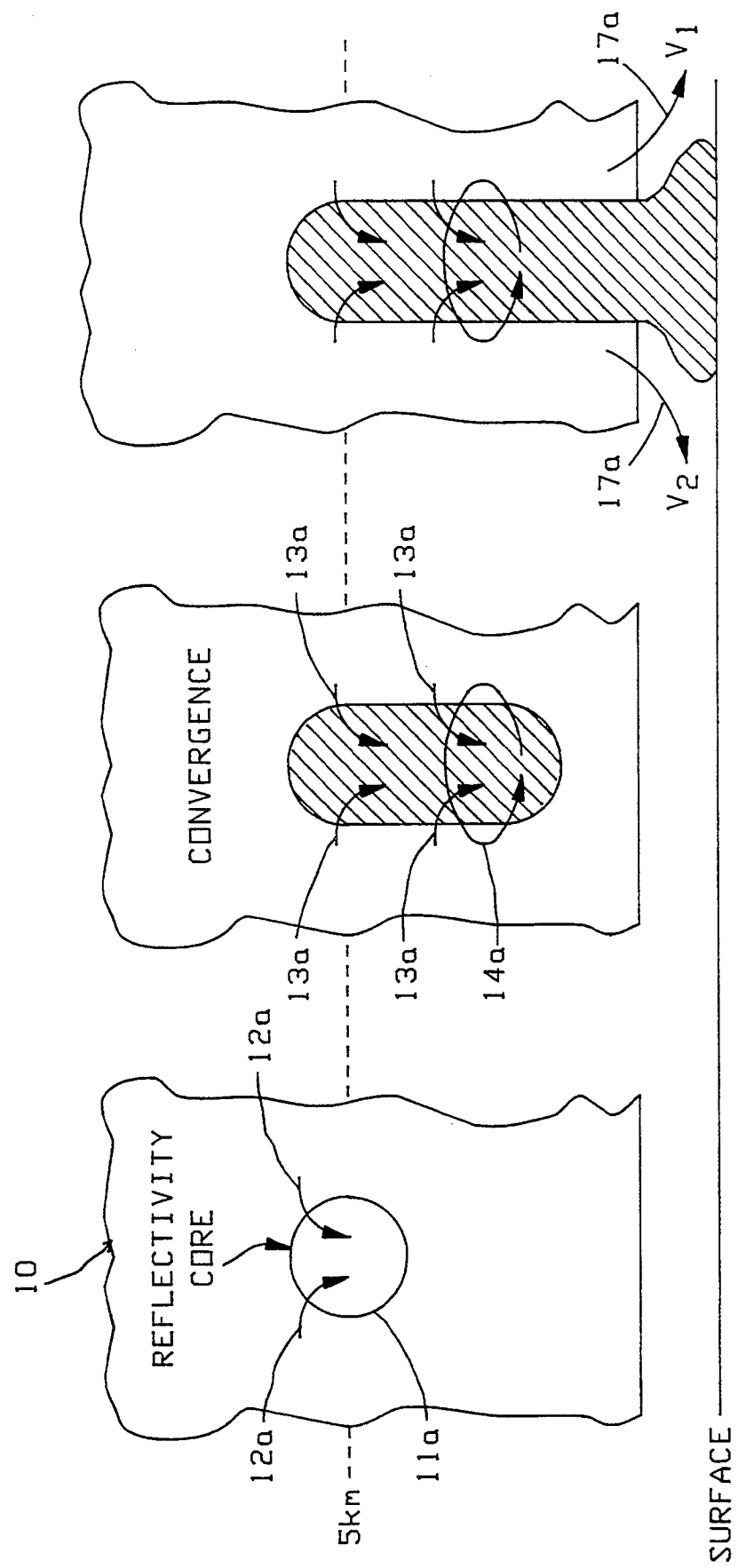
FIG. 2 illustrates the precursors of a microburst.

Microburst precursors occur between 1 and 8 Km above ground level (AGL) about 5-15 minutes prior to the onset of low altitude wind shear. A diagram depicting the formation of a typical wet microburst is shown in FIG. 2. In the first stage 10 a core 112 of densely packed water, with a concomitant high reflectivity, is formed at an altitude of between 3 and 8 Km AGL. Coinciding with the formation of the core 112 is an inflow of air 122 at or above the core 112. When instability causes the high reflectivity core 112 to descend, it-causes an additional convergence of air 132 behind its descent and, in many cases, air rotation 142 of the descending column. The falling high reflectivity core 11 also pushes moisture laden air below it downward, resulting in a strong downdraft which accelerates as air cooling takes place due to moisture evaporation. This high reflectivity core may reach the surface coincident with or after wind shear has been initiated. The strong downdraft establishes an air divergence 172 at the surface, giving rise to the wind velocity differential V=V₂−V₁.

Thus weather phenomena aloft provide detectable precursors from which microbursts at the surface may be predicted with sufficient lead time to prevent an aircraft disaster during landing or takeoff. Precursors associated with the descending downdraft include: a descending reflectivity core, horizontal wind convergence aloft, and horizontal rotation of the downdraft column. These precursors are indirect signatures of the vertical wind downdraft, which is the direct cause of surface microburst wind shear. Since a descending high reflectivity core together with wind convergence and rotation are only indirect signatures of the vertical wind downdraft, they are less reliable than direct measurement of the vertical wind velocity as indicators of an impending microburst. Descending high reflectivity cores, coupled with substantial horizontal wind convergence and rotation, have been observed without the occurrence of subsequent microburst; and microbursts have also occurred in their absence. Consequently, unambiguous prediction of a microburst requires direct knowledge of a vertically descending downdraft having a reflectivity greater than 15 dBz that is typically at least equal to or greater than the surrounding region, and a vertical wind velocity greater than 5 meters per second within a column having an aloft diameter between 1.5 and 3.0 Km. As the moist downdraft descends, evaporation in the column causes cooling and induces an acceleration which can increase the vertical wind velocity up to 25 meters per second. The presence of all three factors establishes a definite precursor of an imminent microburst.

Figure 3:
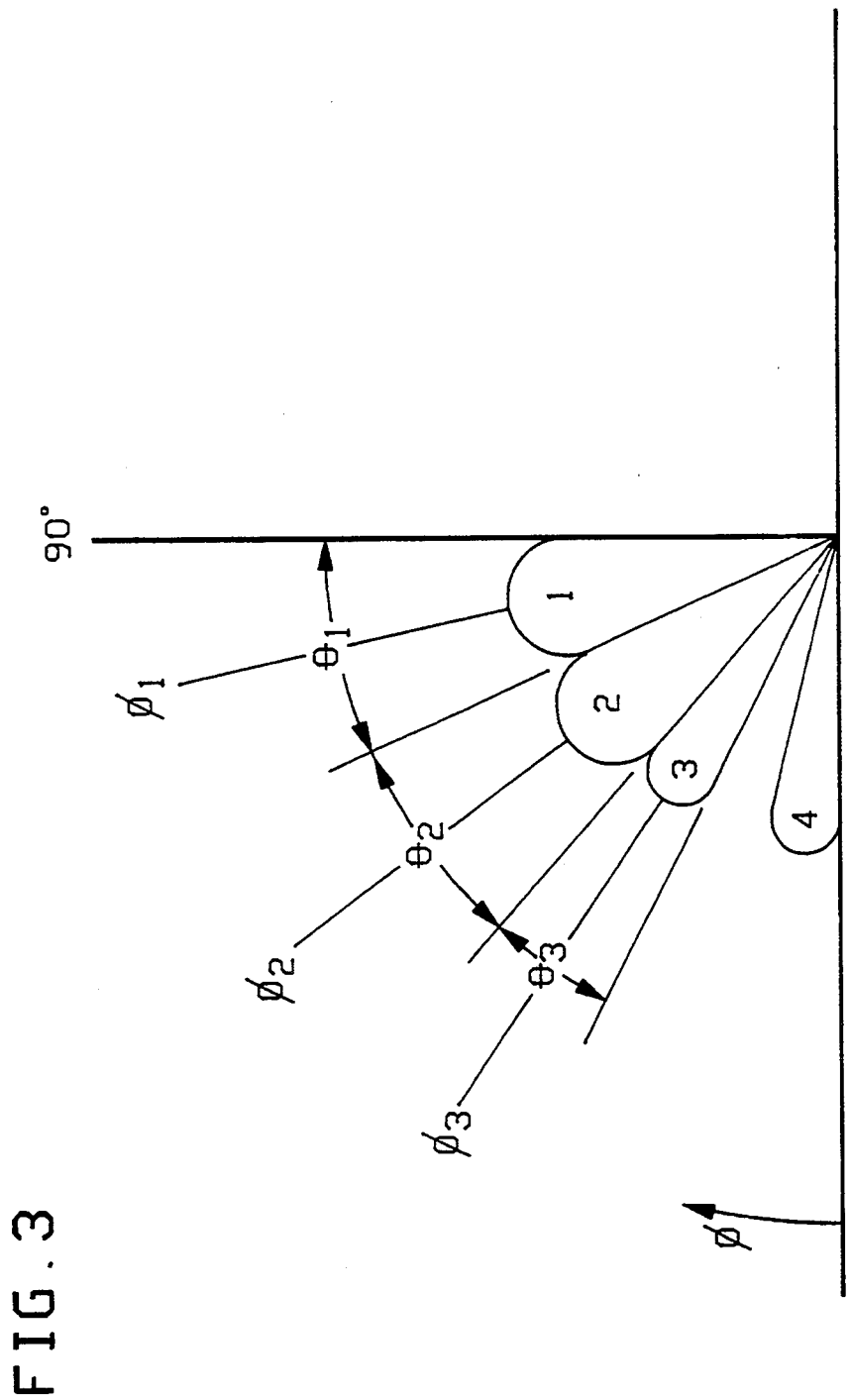
FIG. 3 is an illustration of vertically stacked multiple beams that may be employed to obtain microburst prediction data.

Consequently, an early warning system for the prediction of a surface microburst must be able to detect vertical downdrafts at altitudes 1-3 Km. This may be accomplished with a Doppler radar system having a single beam oriented for high elevation angle scanning or having a multiplicity of stacked beams, each oriented to scan an assigned elevation sector, as shown in FIG. 3. In a stacked beam system, the number of beams and the individual beam widths are selected to provide coverage over a desired altitude range AGL in a region around an airport. Once the elevation coverage and the number of beams to provide this coverage is selected, an elevation beam width for each beam is established which provides approximately the same percentage spread of vertical wind velocity as measured in each elevation beam.

The elevation beam width for each beam in the beam configuration in FIG. 3 would be selected in accordance with the following relationship:

$$\frac{\sin \Theta_1}{\sin \Theta_2} \approx \frac{\sin \Theta_2}{\sin \Theta_3} \approx \frac{\sin \Theta_3}{\sin \Theta_4}$$

where $\theta_1$ are the successive elevation angles defining each elevation beam crossover $\phi_n$, shown in FIG. 3, is the elevation angle of the nth stacked beam. Though only three beams are shown in FIG. 3, this is not restrictive and a greater or lesser number may be chosen to optimize coverage at a system location.

Figure 4:
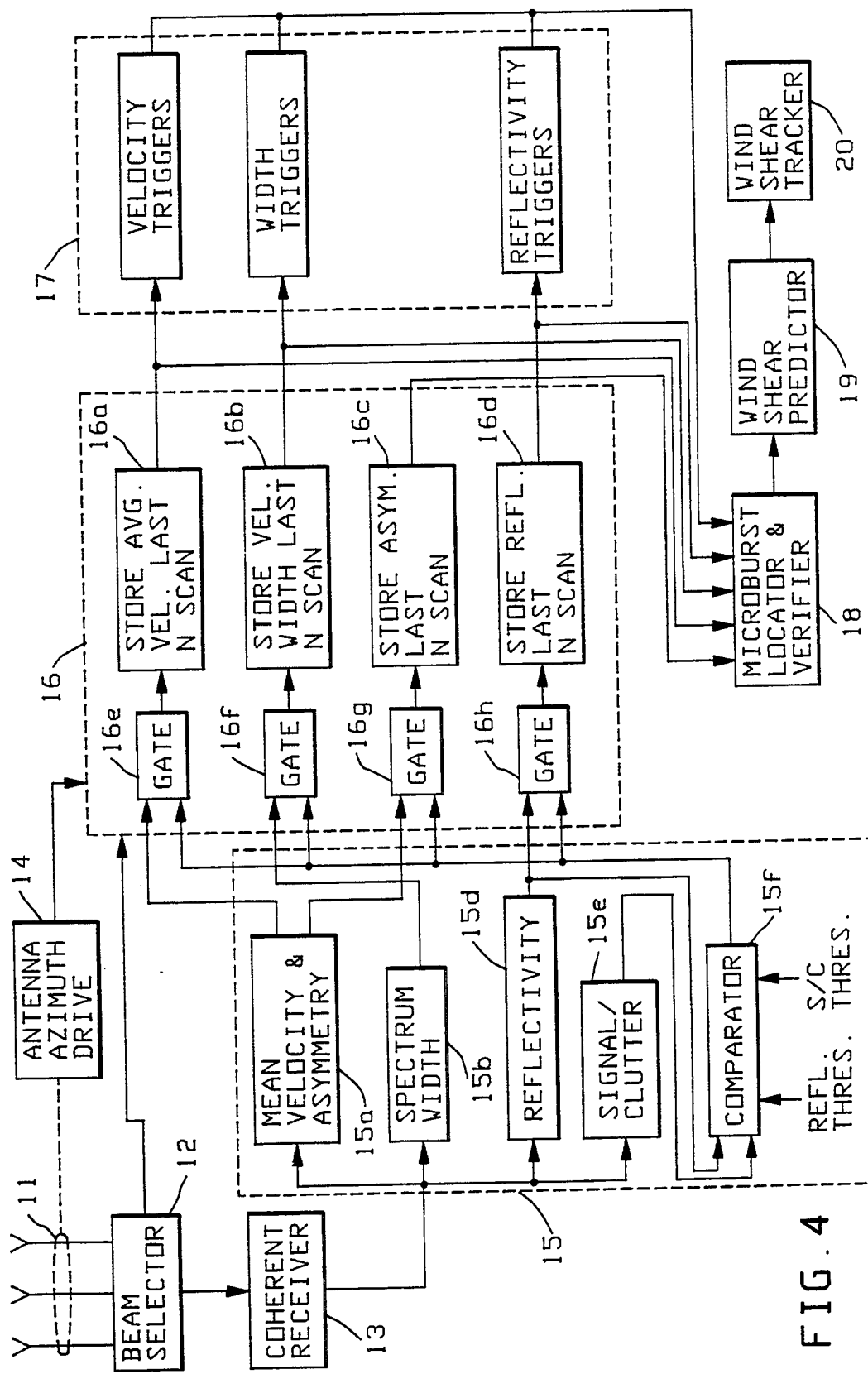
FIG. 4 is a block diagram of a preferred embodiment of the invention.

Refer now to FIG. 4 wherein a block diagram of a preferred embodiment of the invention is shown. Signals received by the stacked beam antenna 11 are coupled to a beam selector 12 wherefrom a selected beam is coupled to a coherent receiver 13. The beams are rotationally selected to provide a continuous elevation sector coverage as the antenna 11 is rotated azimuthally by an azimuth drive mechanism 14. As will be explained, coherent receiver 13 provides two output signals, designated I and Q to a parameter estimator 15 which includes a doppler spectrum-mean (average) velocity estimator 15a, a doppler spectrum velocity width (variance) estimator combined with 2, a mean doppler spectrum asymmetry estimator 15b, a reflectivity estimator 15d, a signal-to-clutter estimator 15e and a combined reflectivity and S/C comparator 15f. Signals representative of the mean spectral velocity estimate, mean spectral width estimate, mean spectral asymmetry estimate, and the reflectivity estimate obtained from processing the I and Q signals are coupled from the parameter estimator 15 to a parameter mapper 16, which also receives slant range representative signals from a range gate generator, not shown, antenna azimuth position representative signals from the antenna azimuth drive mechanism 14, beam selection representative signals from the beam selector 12 and a gating signal from the comparator 15*f* when the reflectivity estimate and signal/clutter ratio estimate both exceed predetermined thresholds.

After a gating signal has been received, the four estimate representative signals for the N most recent azimuthal scans are stored in a mean velocity memory 16*a*, a velocity spectral width memory 16*b*, an asymmetry memory 16*c*, and a reflectivity memory 16*d*. Stored signals 16*a*, 16*b* and 16*d* are coupled to a detection circuit 17, wherein triggers for continued processing are generated. A microburst downdraft locator and verifier 18 processes all four signals stored in the parameter mapper 16 to verify the existence and track of microburst precursors when triggered by signals from the detection circuit. The microburst precursor track signals are coupled to a wind shear predictor 19 wherein the microburst impact location wind shear magnitude, time to impact, and type of microburst (wet or dry) are determined. Microburst impact location and wet or dry microburst information are coupled from the impact location predictor 19 to a wind shear tracker 20 which utilize this data to provide the wind shear surface track from the initial microburst impact location.

Figure 5:
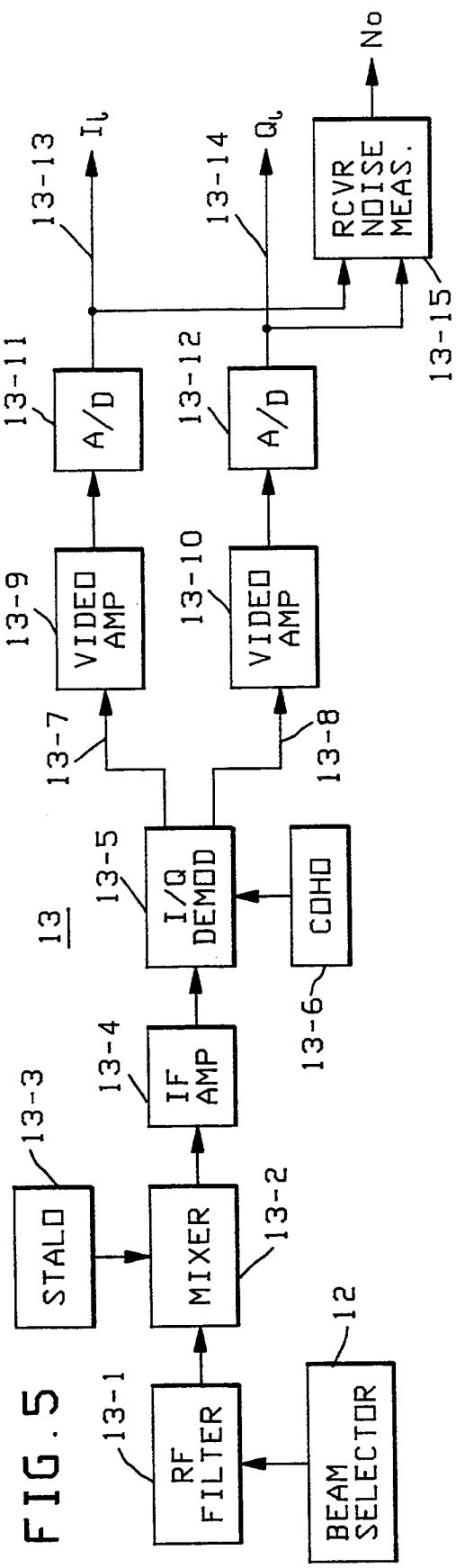
FIG. 5 is a block diagram of a receiver which may be utilized in the preferred embodiment of FIG. 4.

A schematic diagram of a suitable receiver 13 is shown in FIG. 5. Signals from the beam selector 12 are coupled through a RF filter 13-1 to a mixer 13-2 wherein the filtered RF signals, which are within a predetermined bandwidth about the radar operating frequency, are mixed with a signal provided by a stabilized local oscillator (STALO) 13-3 to provide intermediate frequency (IF) signals to an IF amplifier 13-4. The bandwidth of the IF amplifier is chosen to optimize the signal-to-noise ratio and to provide maximum decorrelation between signal samples in adjacent range cells. Signals from the IF amplifier are coupled to an I/Q demodulator 13-5 wherefrom a signal component that is in-phase (I) with a signal coupled to the I/Q demodulator 13-5 from a coherent oscillator (COHO) 13-6 is provided on line 13-7, while a signal component that is in quadrature (Q) with the COHO signal is provided on line 13-8. The I and Q signals are respectively coupled to video amplifiers 13-9 and 13-10 wherefrom the amplified analog signals are converted to digital signals in A/D converters 13-11 and 13-12, respectively. The I and Q digital signals are provided on lines 13-13 and 13-14, respectively, for further processing and to a noise measuring circuit 13-15, wherein the receiver noise is determined. This noise measurement may be performed when the receiver is initially tested and the noise level noted in the system for later use, as will be described subsequently, or it may be performed at periodic intervals to provide an updated noise level and as a receiver check.

Those skilled in the art will recognize that there are two general approaches for estimating mean velocity, spectral width and spectral skewness. One approach is to first calculate the power spectrum of the received pulse train in each range-azimuth bin using digital signals I and Q and then using standard formulas to calculate these quantities. The second is to calculate the complex autocorrelation function of the received signal using digital signals I and Q. The second approach is favored for the preferred embodiment of the invention since estimates of spectral width and spectral skewness will be significantly more accurate at low S/N with this approach.

Figure 6:
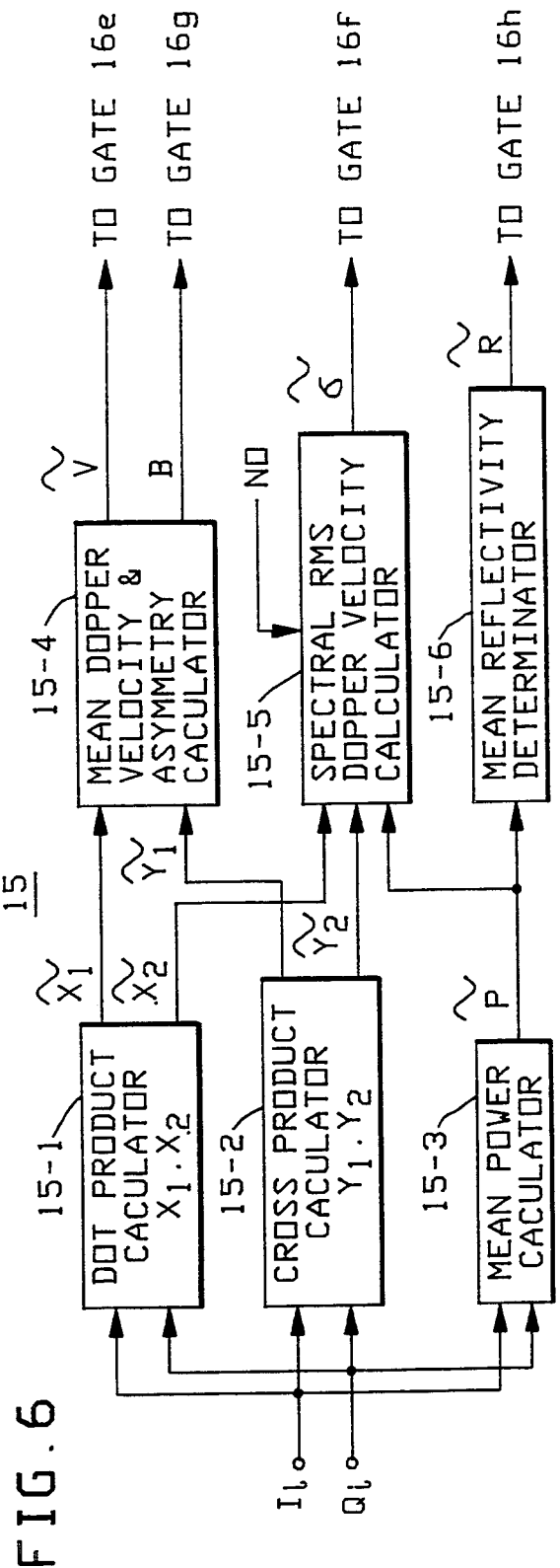
FIG. 6 is a block diagram of a processor which may be utilized for the parameter estimator shown in FIG. 4.

The digit I and Q signals are coupled to a dot product calculator 15-1, a cross product calculator 15-2, and a mean power calculator 15-3 of the parameter estimator 15, as shown in FIG. 6. A pulse repetition rate for he radar transmitter is chosen to provide a multiplicity of pulses per range cell which, for example, may be 1600. These pulses are processed utilizing a predetermined number of pulse intervals which, for example, may be 1 through 16. The 1 pulse interval is representative of processing that meets the Nyquist criteria for providing unambiguous resulting signals. Pulse intervals greater than 1 are representative of processing that does not meet this criteria but are utilized for the sake of significantly improving parameter estimates of mean doppler velocity, doppler velocity spectral width and spectral asymmetry. When 1 pulse interval is utilized, dot product calculator 15-1 multiples the I component of a received signal within a given range bin with the I component of the next received signal in that range bin and adds the product so obtained with the product obtained by similarly multiplying the Q component of the received signal with the Q component of the next received signal. These summed products may be obtained by multiplying the I and Q components for the first and second received signals, the second and third received signals, the third and fourth received, etc. Summed products may then be averaged over the number of product sums to provide a signal representative of an averaged product-sum $X_1$. In 2 pulse interval processing, the I and Q components of the first and third received signals are multiplied, the second and fourth received signals are multiplied, and so on to form product-sums, which are then averaged to provide a signal representative of a second averaged product-sum $X_2$. The average values $X_m$ may be expressed mathematically as:

$$X_m = \frac{1}{N-m} \sum_{n=1}^{M-m} I_n I_{n+m} + Q_n Q_{n+m}$$

$$m = 0, 1, 2, \ldots, M$$

Note that m=o provides an estimate of the average received power in a range bin.

Cross product calculator 15-2 operates in a manner similar to that of the dot product calculator 15-1. In this unit, however, when one pulse interval processing is utilized, the product of the I component of the second received signal with the Q component of the first received signal is subtracted from the product of the I component of the first signal with the Q component of the second received signal. Such multiplication and subtraction continues with the I component of the second received signal multiplied with the Q component of the third received signal and the I component of the third received signal multiplied with the Q component of the second received signal, and so on. The difference of the paired signal products may then be summed and averaged to provide a signal representative of an averaged cross product $Y_1$. When two pulse interval processing is utilized, the multiplications are between the components of the nth and the nth plus two received signals. As previously, the differenced products are summed and averaged to provide a signal representative of an averaged cross product $Y_2$. The averaged cross products $Y_m$ may be expressed mathematically as:

$$Y_m = \frac{1}{N-m} \sum_{n=1}^{N-m} I_n Q_{n+m} - I_{n+m} Q_n$$

$$m = 1, 2, \ldots, M$$

Those skilled in the art will recognize that the dot and cross products are the real and imaginary parts of the auto correlation function for a selected lag value m of the received signals. The products $X_1$ and $Y_1$ may be coupled to a mean doppler velocity calculator 15-4 wherein an unambiguous value of the mean doppler velocity V is determined from the following formula:

$$V = \frac{\lambda}{4\pi h} \tan^{-1} \frac{Y_1}{X_1}$$

where h is the sampling period (sampled-pulse interval) and $\lambda$ is the radar signal wavelength. Higher order lag products $X_m$ and $Y_m$ may be utilized to improve the estimate of V by properly removing the velocity ambiguity in $\tan^{-1}(Y_m/X_m)$ using $\tan^{-1}(Y_1/X_1)$ as a reference and averaging all estimates. Mean power calculator 15-3 squares and sums the I and Q components for each received signal to determine the power of each received signal and averages the powers of all the received signals. This corresponds, as previously noted, to a dot product for which m=o. The mean power P is therefore:

$$P = \frac{1}{N} \sum_{n=1}^{N} [(I_n)^2 + (Q_n)^2]$$

Doppler velocity spectral width $\sigma$ may be determined from the magnitude of the autocorrelation function at various lags. The generic form is as follows:

$$\sigma^2 = \frac{1}{2\pi^2 h^2 n^2} \frac{|R(mh)| - |R(nh)|}{|R(mh)| - (1/n^2)|R(nh)|}$$

for $m < n$ $n = 2, 3, \ldots, N$ and where N corresponds to the highest order useful lag Nh (N is limited by the correlation width of the rain return). While all of the above yield the same value of $\sigma$, selected values of m and n are either more convenient for calculation or yield more accurate results. The $\sigma$ estimates provided by a set of selected values of (m,n) are averaged to further improve the estimate accuracy of $\sigma$. The sampling rate based on the Nyquist criteria does not affect the determination of $\sigma$. Thus an unambiguous mean velocity a and the doppler spectral width $\sigma$ for the rain are obtained with an economy of memory and processing time.

A third parameter necessary for the determination of a microburst precursor may be established by coupling the power representative signal P from the mean power calculator 15-3 to a mean reflectivity determinator 15-6. Radar reflectivity Z is related to $\eta$, the scatter cross-section per unit volume, by $$\eta = \frac{\pi^5}{\lambda^4} |K_w|^2 Z$$

Since Kw is close to unity in the present application, $$\eta \approx \frac{\pi^5}{\lambda^4} Z$$

The scattering cross-section A is computed as $$A = \eta V = \frac{\pi^5}{\lambda^4} Z V$$

where V is a unit volume of precipitation with radar reflectivity Z. Knowledge of the power received in a particular range bin together with its range and the radar's operating parameters permits the calculation from the radar equation of A and V and therefore Z. Since the radar parameters and range are known a-priori for each range bin, a look up table can be constructed which permits direct calculation of Z for each range bin from the power P measured in that range bin.

Figure 7:
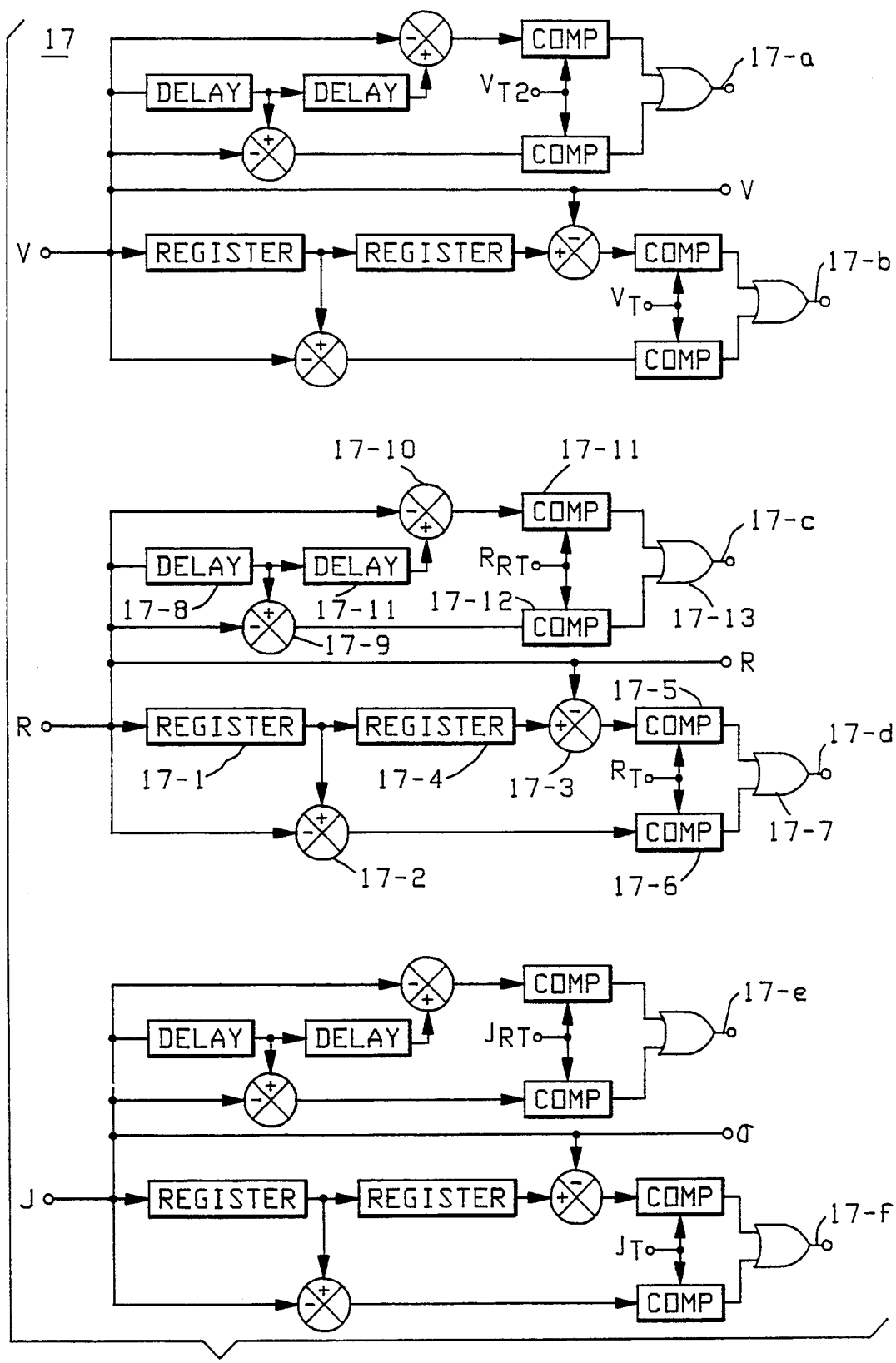
FIG. 7 is a block diagram of a processor which may be employed for the detection triggers of FIG. 4.

Refer again to FIG. 4. A signal representative of the estimated reflectivity is coupled from the reflectivity estimator 15c to the comparator 15f wherein it is compared with a signal representative of a threshold reflectivity, which, for example, may be 15 dBz. When the threshold signal in a particular range bin is exceeded, gates 16e, 16f, and 16h are activated and the mean velocity, variance, and reflectivity for the range bin are stored in the memories 16a, 16b, and 16d, respectively; otherwise, a zero is recorded. Memories 16a, 16b and 16d contain stored entries for the last N, as for example 3, antenna scans. Each entry in the memories is coupled to the detection circuit 17, wherein each is subtracted from each of the corresponding entries for the two previous scans to obtain temporal differences of rain doppler velocity, rain doppler velocity spectral width, and rain reflectivity. Additionally, each range bin entry is subtracted from the corresponding entry for the two previous range bins to obtain spatial differences of the three parameters. Each difference is compared to a predetermined threshold, and if the threshold is exceeded, a trigger signal is generated. A schematic representation of this processing, in block form, is shown in FIG. 7. Whenever either of the entries in a subtraction is zero, the difference is defined as zero and does not exceed the threshold.

Since the processing described above is similar for all three parameters, only the processing relating to the reflectivity R will be discussed with reference to FIG. 7. The reflectivity representative signals from the reflectivity determinator 15-6 (FIG. 6) for each azimuth sweep are coupled to a first shift register 17-1 wherein each stage of the register corresponds to a range bin along the selected azimuth range sweep and to the negative input terminals of summation networks 17-2 and 17-3. Range bin data for successive range sweeps for an antenna scan are serially entered in shift register 17-1. When the register 17-1 is full, the last stage contains the reflectivity data for the first range bin of the first range sweep and the first stage contains the reflectivity data for the last range bin of the last sweep of the antenna scan period. At the entry of data for the first range bin of the first range sweep on the next scan into the first stage of shift register 17-1, all data in the register shifts one stage and the data in the last stage is coupled from the register 17-1 to the first stage of a second shift register 17-4 and to the positive input terminal of summing network 17-2. Each reflectivity entry causes the data to shift one stage in each shift register. After two complete scans, reflectivity data for all range sweeps have been entered into the registers, with the data for the first range bin of the first range sweep in each of the two previous antenna scans entered respectively in the last stage of each register. Upon the coupling of the first range bin data of the first range sweep on the third scan to the shift register 17-1 and the summation networks 17-2 and 17-3, the data in the first range bin of the first range sweep of the two previous antenna scans are respectively coupled to the positive input terminals of summation networks 17-2 and 17-3. The difference signals at the output terminals of the summation networks are coupled respectively to comparators 17-5 and 17-6 wherefrom each provides a trigger signal to an OR gate 17-7 should the reflectivity difference signal exceed a predetermined threshold signal $R_T$. This process is repeated for each antenna scan.

The reflectivity representative signals in each range sweep are also coupled to delay line 17-8, wherein the signals are delayed for one range bin interval, and to the negative inputs of summation networks 17-9 and 17-10. Signals delayed for one range bin interval in delay line 17-8 are then coupled to the positive input terminal of summation network 17-9, and to delay line 17-11 wherein a second delay of one range bin interval is encountered. After the second delay the signals are coupled to the positive input terminal of summation network 17-10. It should be apparent that the signals at the positive input terminals of the summation networks represent the reflectivity data in adjacent range bins for the same azimuth sweep and that the signals at the output terminals of summation networks 17-9 and 17-10 are the differences between the reflectivity representative signals for adjacent range bins and between reflectivity representative signals for two range bins separated by one range bin. These difference signals are respectively coupled to comparators 17-11 and 17-12 wherefrom trigger signals are coupled to OR gate 17-13 when the difference signals exceed a second reflectivity representative threshold signal $R_{RT}$. Trigger signals for the doppler velocity V and doppler velocity spectral width are generated in a similar manner. In this manner six possible triggers (one spatial and one temporal for each of the three parameters) may appear at the output terminals a-f of OR gates 17a-17f.

Figure 8:
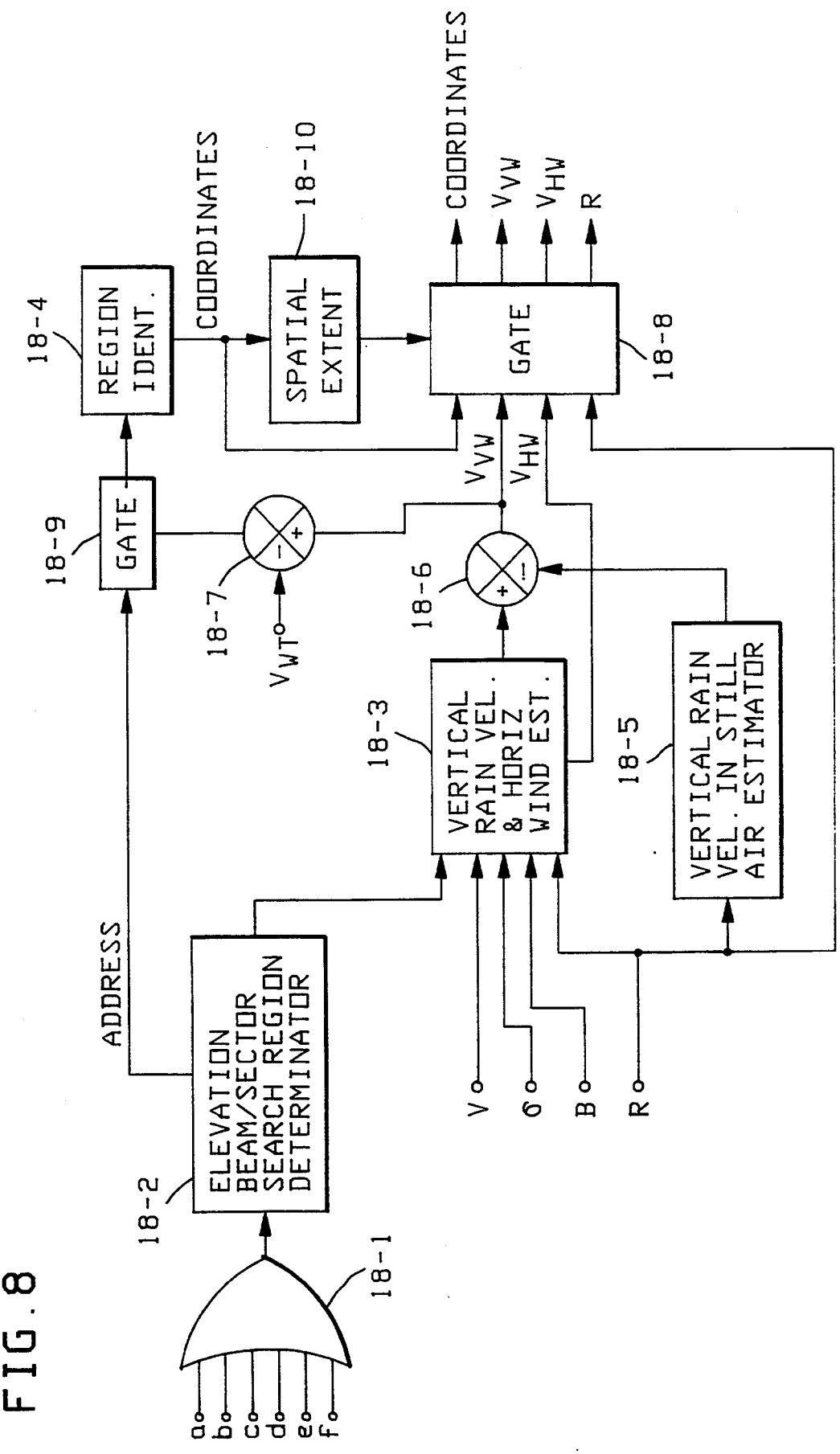
FIG. 8 therefore illustrates processors which may be employed for the microburst locator shown in FIG. 4.

Output terminals a-f are coupled to an OR gate 18-1 of microburst downdraft verifier 18a, as shown in FIG. 8. Thus, if anyone of the six triggers are generated, OR gate 18-1 couples an enable signal to an elevation beam/sector search region determinator 18-2. Upon reception of the enable signal, the region determinator 18-2 identifies a region in which at least one trigger has-been generated and provides an enable signal to vertical rain velocity and horizontal wind velocity estimator 18-3. Upon reception of this enable signal, estimator 18-3 commences processing of the signals within the identified elevation beam/sector search region coupled thereto from the memory 16. Though not shown in the figure, it should be understood that the processing is performed in all three radar beams.

The values of V, $\sigma$, $\beta$, and R for each range cell within the search region are coupled to a vertical rain velocity estimator 18-3, while the coordinates of each range cell within the search region are coupled via a gate 18-9 to a precursor region identifier 18-4. Stored in vertical rain velocity estimator 18-3 are pre-calculated data which permit estimates of the vertical and horizontal raindrop velocity in the downdraft to be determined from estimated quantities $V_p$, $\sigma$ and $\beta$. The vertical and horizontal velocity of the falling precipitation are uniquely related within each elevation beam to a 3 parameter set consisting of mean doppler velocity V, doppler spectral width $\alpha$, and doppler spectral asymmetry b. This is a result of the fact that a doppler radar measures the vertical velocity component $V_\nu$ of the raindrops multiplied by the sine of the elevation angle $\theta$ within an elevation beam while the horizontal velocity component $V_H$ of the raindrops couple into the radar doppler measurement multiplied by the cosine of the elevation angle $\theta$.

In elevation beam 1, $\theta$ varies from 87° to 47°. Hence, contributions to the doppler spectrum by the vertical velocity raindrop component $V_\nu$ are multiplied by values varying from sin 87° through sin 47° across the elevation beam. Similarly, the raindrop horizontal velocity $V_H$ contributions to the doppler spectrum are multiplied by values varying from cos 87° through cos 47°. The measured doppler spectrum is the sum of both $V_\nu \sin \theta$ and $V_H \cos \theta$ contributions. As a result, the three parameter set of mean doppler spectral velocity, doppler spectral width and doppler spectral asymmetry, $\{V,r,b\}$ is a unique function of the vertical and horizontal raindrop velocities $\{V_\nu,V_H\}$. For a particular combination of raindrop vertical and horizontal velocity $\{V_\nu,V_H\}$, either the paired measurement set $\{V,\alpha\}$ or the paired measurement set $\{V,\beta\}$ is sufficient to uniquely estimate $\{V_\nu,V_H\}$. By utilizing both paired relationships, accuracy is significantly improved. The above explanation also applies to elevation beams 2 and 3 except that $\{"V_\nu,V_H\}$ have different relationships to $\{V,\alpha\}$ and $\{V,\beta\}$, as a result of the different elevation angle coverage within each elevation beam. Because the above paired relationships are the direct result of radar beam geometry, they can be pre-calculated and stored in vertical and horizontal velocity estimator 18-3 for each elevation beam. Typical curves which relate $\{V,\beta\}$ to raindrop vertical and horizontal velocity $\{V_\nu,V_H\}$ and which relate $\{V,\sigma\}$ to $\{V_\nu,V_H\}$ for a typical elevation beam are shown in FIGS. 9 and 10, respectively.

Figure 9:
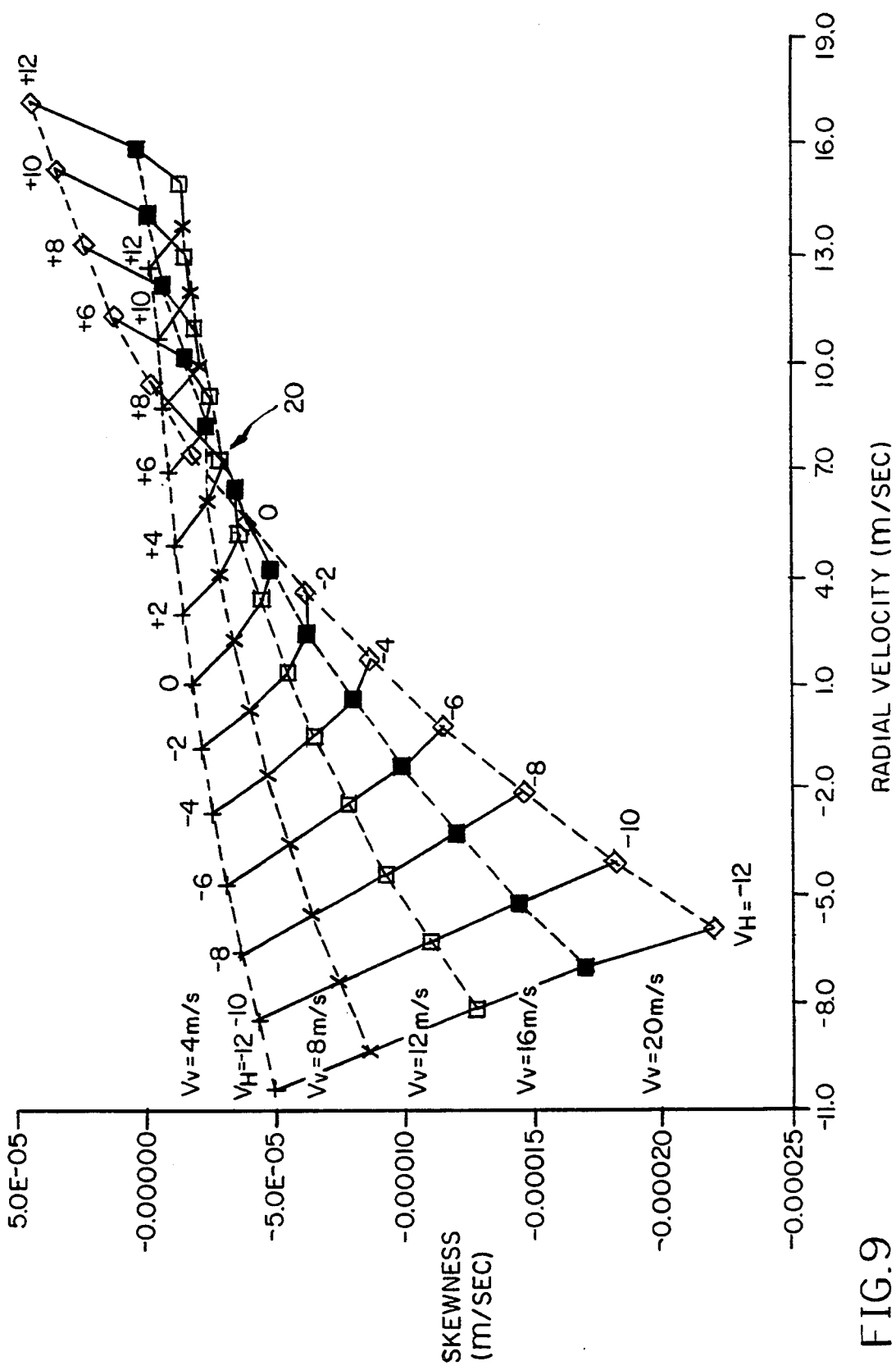
FIG. 9 is a plot of doppler spectral skewness vs. radial velocity.
Figure 10:
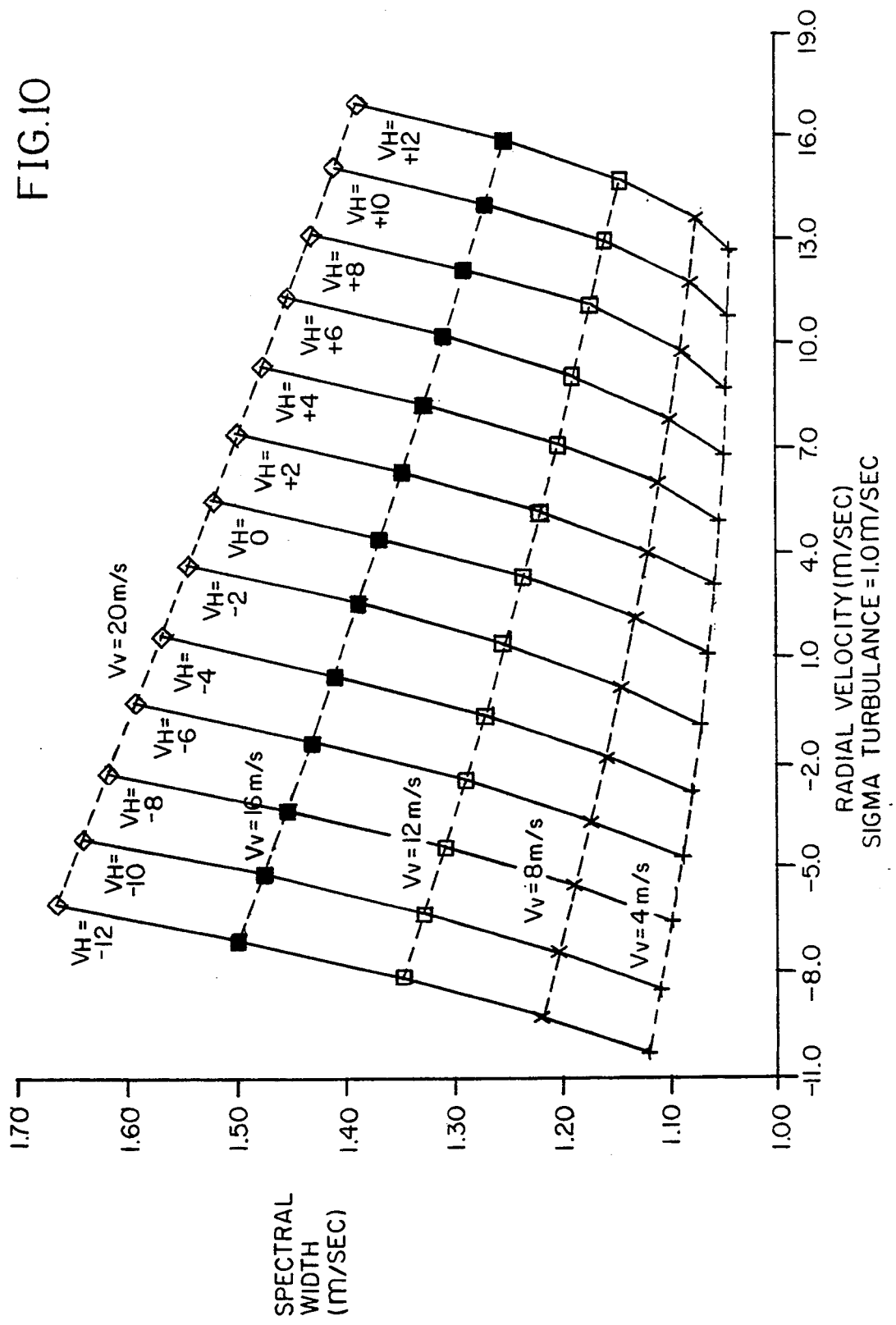
FIG. 10 is a plot of doppler spectrum width vs. radial velocity.

An examination of FIG. 9 indicates a region 20 where a pair of radial velocity and skewness values do not lead to a unique set of $\{V_\nu,V_H\}$ values. Characteristics of a microburst may be utilized to resolve these ambiguities. Due to frictional effects of the surrounding air on the vertical velocity, the downdraft velocities in a microburst are slower at the edges than the are at the center of the microburst. These frictional forces have no effect on the horizontal velocities. Consequently the horizontal velocities remain constant across the downdraft. In a preferred embodiment of the invention a typical microburst extends across 5-to-10, 300 meter wide, range bins in a range sweep. A set of radial velocity-skewness values is determined for of each of these range bins. Though some variation in $V_H$ may exist between range bins, only one value of $V_H$ exists for a paired value of radial velocity-skewness in each range bin for any one range sweep. This value of $V_H$ may be determined from plot of spectral width vs radial velocity shown in FIG. 10. Once the horizontal velocity is determined in a range bin it may be used to determine the vertical velocity in that range bin from the skewness-radial velocity plot shown in FIG. 10, thereby establishing unique values for $V_V$ and $V_H$.

It should be understood that other methods of resolving the ambiguity exist. For example, after $V_H$ has been established in each range bin from FIG. 10, the $V_H$ values may be averaged and the averaged value used in FIG. 9 to establish $V_v$.

Another method for resolving the ambiguity employees the relationship to calculate $V_v$:

$$V_{RAD} = V_v \sin\theta_e + V_H \cos\theta_e$$

where $\theta_e$ is known for each beam, $V_{RAD}$ is the estimated average doppler for each range bin, and $V_H$ is determined by one of the two above described methods. This approach may provide a more accurate estimate of $V_v$ for each range bin of the range sweep than either of the methods previously described.

Another method of estimating the vertical velocity $V_v$, one which may provide still greater accuracy and also establish confirmation of a microburst downdraft precursor, utilizes FIG. 10 and the known standard deviation of raindrop turbulence in a microburst downdraft. A typical microburst downdraft is characterized by raindrop turbulence with a standard deviation of substantially 1 meter per second. The curves of FIG. 10 are based on this value. If the turbulence standard deviation is greater than some pre-established value, as for example, 2 meters per second, it is determined that the downdraft is not a microburst precursor. Since V is constant across the downdraft, a plot of spectral width vs radial velocity for the range bins spanning the microburst define the slope of a constant $V_H$ curve. If a slope for the spectral width vs radial velocity curve, significantly greater than the slope in a Corresponding a region of FIG. 10 is obtained from the data, a turbulence standard deviation that is greater than 1 meter per second is indicated. The measured slope is a direct measure of the standard deviation. It is straight forward to replace the curves of FIG. 10 with plots having a higher value of turbulence standard deviation. The revised plot may then be used to estimate $V_v$ and $V_H$ for each range bin. Such revised curves may be used to obtain a separate estimate of $V_H$ for each range bin spanning the downdraft. These estimate values of $V_H$ may then be averaged to increase the estimate accuracy of $V_H$. The averaged value of $V_H$ with the measured value of $V_{RAD}$ in each range bin can be substituted into the previous equation to obtain a direct estimate of $V_v$ in each range bin.

In order to increase the estimation accuracy of $V_v$ and $V_H$, it is desirable to increase the number of processed pulses in each range bin, as for example, from 1600 pulses to 64,000 pulses, in the microburst search region. While there are many ways this can be done, one way is to reduce the transmitted pulse length, as for example, from 2 microseconds to 0.05 microseconds with no change in pulse repetition frequency, and sampling I and Q in the receiver every 0.05 microseconds instead of every 2 microseconds. This generates 40 range bins where there was previously one range bin. The 1600 pulses received in each of the forty 0.05 microsecond range bins are sequentially stacked to comprise a 64,000 pulse return over a 2 microsecond range interval where previously there was only one 1600 pulse return. The 1600 pulse return from rain in each 0.05 microsecond range bin is statistically independent of the rain return in all the other range bins. The increase in the number of processed pulses from 600 to 64,000, a factor of 40, reduces the variance of the estimates of R, V, $\sigma$ and $\beta$ by 40. This significantly improves the estimates of $V_v$ and $V_H$. The processing change has no effect on the relations between $\{V,\sigma,\beta\}$ and $\{V_v,V_H\}$ shown in FIGS. 9 and 10.

Precipitation vertical velocity in still air is a function of raindrop size. The radar reflectivity of precipitation is also a function of raindrop size. It has been shown by Joss and Waldvogel ("Raindrop Size Distribution and Doppler Velocities," 14th Radar Meteorology Conference, American Meteorological Society, Nov. 17–20, 1970) that when both quantities are measured simultaneously in the absence of wind by a doppler radar, they are empirically related by $$v = 2.6 \, Z^{.107}$$

where v is doppler radar measured vertical velocity and Z is precipitation radar reflectivity.

Refer again to FIG. 8. Measured reflectivity R in the search region is coupled to vertical rain velocity in still air estimator 18-5 wherein the Joss-Waldvogel relationship is utilized to obtain an estimate of the vertical rain velocity in still air. This estimate is coupled to a differencing network 18-6, wherein it is subtracted from the vertical rain velocity estimate, coupled to the differencing network 18-6 from the vertical rain velocity and horizontal wind estimator 18-3, to obtain the vertical wind velocity $V_{vw}$.

This vertical wind velocity is compared to a threshold downdraft velocity $V_{wt}$, which is representative of a minimum downdraft velocity of a microburst, in a comparator 18-7 wherefrom a signal is coupled to enable the gate 18-9; thereby providing the address of the range bins in which the downdraft velocity exceeds the threshold to the precursor region identifier 18-4. These addresses are stored in the region identifier 18-4 wherefrom they are coupled to gate 18-8 and to a spatial extent tester 18-10, wherein the spatial extent of the downdraft velocity exceeding the threshold is determined and compared to a stored spatial extent of a microburst. Should the comparison determine that the spatial extent of the downdraft velocity exceeding the threshold is comparable to that of a microburst, gate 18-8 is activated and the values of vertical and horizontal wind velocity, reflectivity, and location are provided at the output terminals of the gate 18-8.

Figure 11:
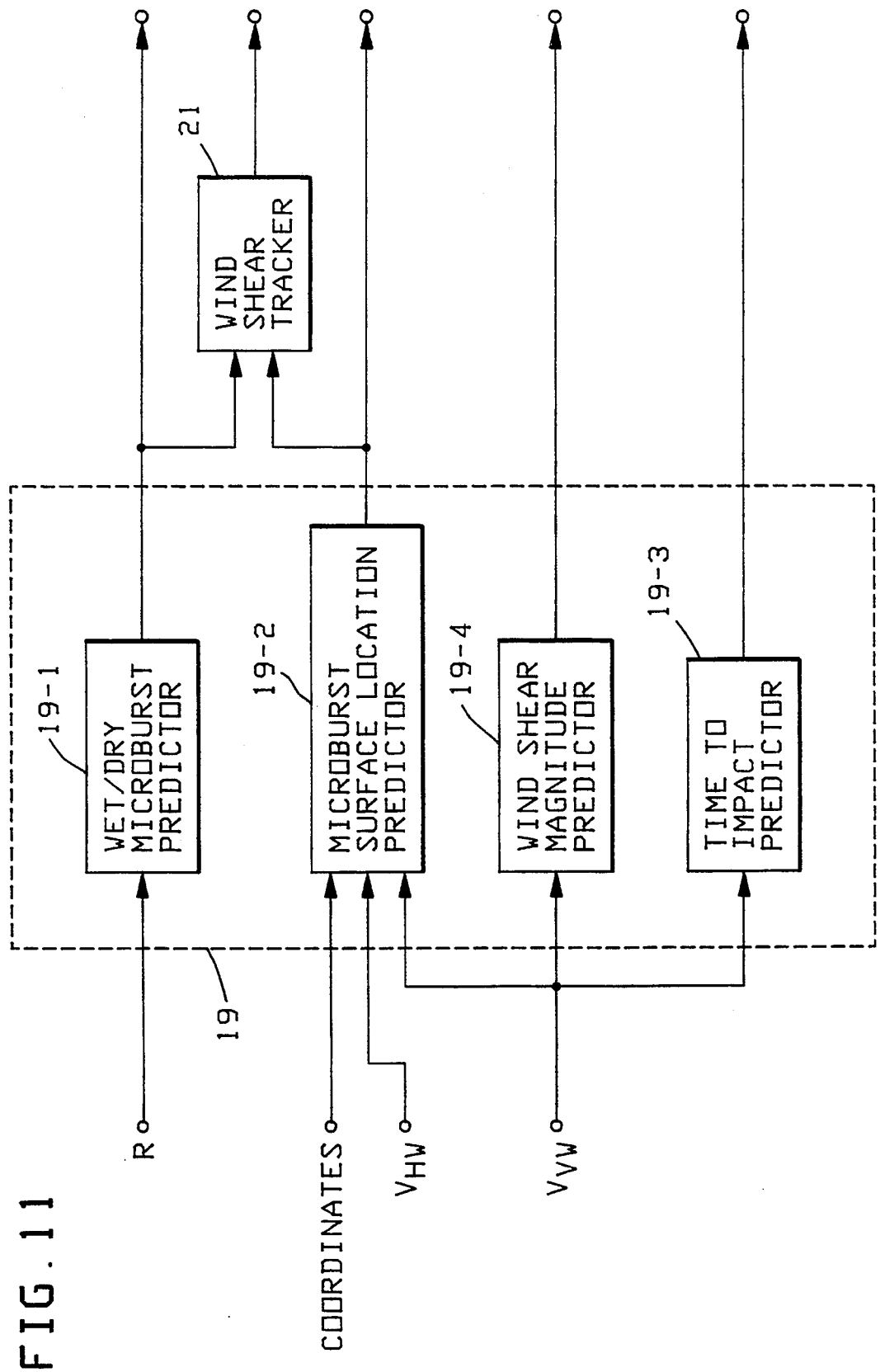
FIG. 11 is a block diagram of a processor which may be employed as the WIND SHEAR PREDICTOR of FIG. 4.

The horizontal and vertical wind velocities, reflectivity, and location coordinates coupled through gate 18-8 are provided to the wind shear predictor 19 (FIG. 4), a block diagram of which is shown in FIG. 11. The reflectivity is coupled to a microburst predictor 19-1 wherein a prediction of a wet or dry microburst, based upon the magnitude of the reflectivity, is made. A dry microburst is predicted should R be between 15–25 dBz and a wet microburst is predicted should R be above 25 dBz.

Horizontal wind velocity provided from the horizontal wind velocity estimator 18-3, the vertical wind velocity provided from the differencing network 18-6, and the coordinates of the region in which the downdraft exceeds the threshold are coupled to a microburst surface location predictor 19-2 which utilizes this data in a conventional manner to predict the surface location of the microburst impact. The highest vertical wind velocity in the downdraft region is also coupled to a time to impact predictor which, in a conventional manner, predicts the time that the microburst will impact the surface and to a wind shear magnitude predictor 19-4.

Wet/dry microburst predictor 19-1 and surface location predictor 19-2 each couple data to the wind shear tracker 21, which also receives radar data from a radar receiver (not shown) that is coupled to a doppler radar beam which provides coverage near ground level, beam 4 in FIG. 3. The wet/dry microburst data, the predicted microburst impact location, and the data provided by the receiver coupled to beam 4 are utilized to track the wind shear along the surface and provide predictions of subsequent wind shear locations.

Dry microburst surface wind shear contains a very small amount of moisture, since most of the original moisture content aloft evaporates before the downdraft reaches the surface. As a result it is very difficult to detect a dry microburst wind shear during its earliest occurrence at ground level because of ground clutter, without the predicted microburst downdraft impact location and wind shear magnitude. Using information from the wet/dry microburst predictor, the time-to-impact predictor, and the microburst surface location predictor, the receiver coupled to beam 4 searches the range-azimuth bins covering the predicted surface impact area on each scan to pick up the first indications of wind shear resulting from the downdraft reaching the ground. After initial detection of the wind shear, beam 4 derived information provides up-to-date information with respect to the location and magnitude of microburst wind shear. This information is provided until the wind shear magnitude attenuates to the point at which it is no longer a treat.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A method for predicting weather disturbances comprising the steps of:
   providing radar surveillance over an elevation angular region through a plurality of azimuthally scanned radar beams, each beam providing radar surveillance in a respective elevation angular sector in said angular region;
   processing radar signal returns to estimate doppler spectrum parameters generated in each radar beam and to estimate average radar reflectivity of meteorological scatterers in each beam;
   utilizing said doppler spectrum parameters and said average reflectivity to respectively estimate vertical velocity of said meteorological scatterers and vertical velocity in still air of said meteorological scatterers;
   processing said vertical velocity and vertical velocity in still air to obtain vertical wind velocity; and
   utilizing said vertical wind velocity and said average reflectivity to predict the occurrence of a microburst.

2. A method in accordance with claim 1 further including the steps of:
   comparing said doppler spectrum parameters and said average radar reflectivity of a radar azimuth scan to corresponding doppler spectrum parameters and average radar reflectivity obtained for at least one previous azimuth scan to derive spatial and temporal differences;
   comparing said spatial and temporal differences to predetermined spatial and temporal difference thresholds, respectively, and generating a trigger signal for each spatial and temporal difference exceeding its difference threshold;
   coupling said trigger signals to enable processor means when at least one trigger signal is generated; and
   processing said doppler spectrum parameters and said average reflectivity to predict whether a microburst precursor is present.

3. A method in accordance with claim 1 wherein said radar signal processing step includes the steps of:
   estimating average doppler frequency;
   estimating doppler spectrum skewness; and
   estimating spectral width of said doppler spectrum;
   said average doppler frequency, said spectrum skewness, and said spectral width comprising said doppler spectrum parameters;
   utilizing said doppler spectrum parameters and said average radar reflectivity to estimate said vertical wind velocity; and
   utilizing said doppler spectrum parameters to estimate horizontal wind velocity.

4. A method in accordance with claim 1 wherein said doppler spectrum parameters and said average radar reflectivity utilizing step includes the steps of:
   estimating vertical velocity of said meteorological scatterers from said doppler spectrum parameters;
   estimating vertical velocity in still air of said meteorological scatterers from said average radar reflectivity; and
   subtracting said vertical velocity in still air from said vertical velocity to estimate vertical wind velocity.

5. A method in accordance with claim 3 wherein said doppler spectrum parameters and average reflectivity utilizing step further includes the steps of:
   estimating location parameters of said vertical wind velocity from radar range information and radar beam position;
   coupling said location parameters to spatial extent means for determining spatial extent of said vertical wind velocity;
   comparing said spatial extent to a predetermined spatial extent associated with a microburst and providing an enabling signal when said spatial extent exceeds said predetermined spatial extent;
   coupling said enabling signal to gate means; and
   coupling said vertical wind velocity, said horizontal wind velocity, said average radar reflectivity, and location parameters via said gate means to windshear predictor and tracker means for providing time to impact of microburst, surface location and track of predicted windshear, and predicted magnitude of windshear.

6. A method in accordance with claim 1 wherein said doppler spectrum and radar reflectivity utilizing step further includes the steps of:
   comparing said average reflectivity with reflectivity value associated with a microburst;
   providing a first enabling signal to first gate means when said average reflectivity exceeds said reflectivity associated with a microburst;
   coupling said doppler spectrum parameters via said first gate means to processor means;

comparing said vertical wind velocity to a predetermined vertical wind velocity associated with a microburst and providing a second enabling signal to second gate means when said vertical wind velocity exceeds said predetermined vertical wind velocity; and coupling said location parameters via said second gate means to said spatial extent means.

7. An apparatus for predicting weather disturbances comprising:

surveillance means for providing radar surveillance with a plurality of radar beams, each beam providing radar surveillance in a respective elevation angular sector;

estimator means coupled to said surveillance means and responsive to radar signal returns for providing signals representative of doppler spectrum parameters generated in each radar beam and signals representative of average radar reflectivity of meteorological scatterers in each radar beam,;

velocity means responsive to said doppler spectrum parameters representative signals and said average radar reflectivity representative signals for providing signals representative of vertical velocity of said meteorological scatterers and signals representative of vertical velocity in still air of said meteorological scatterers;

wind means responsive to said vertical velocity representative signals and said velocity in still air representative signals for providing vertical wind velocity representative signals; and predictor means responsive to said vertical wind velocity representative signals and said average radar reflectivity representative signals for predicting whether a microburst is present.

8. An apparatus in accordance with claim 7 further comprising:

memory means coupled to said estimator means for storing said doppler spectrum parameters representative signals and said average reflectivity representative signals;

comparator means for comparing said average radar reflectivity representative signals to a signal representative of a determined reflectivity value and providing an enable signal to said memory means when said average radar reflectivity representative signal exceeds said predetermined reflectivity representative signal;

detection means coupled to said memory means and said processing means for respectively comparing doppler spectrum parameters representative signals and average radar reflectivity representative signals of a radar azimuth scan to corresponding doppler spectrum parameters representative signals and average radar reflectivity representative signals obtained for at least one previous scan to derive spatial and temporal differences and for comparing said spatial and temporal differences to predetermined spatial and temporal differences, respectively, generating a trigger signal for each spatial and temporal difference exceeding its difference threshold and coupling an enabling signal to said processing means when at least one trigger is generated.

9. An apparatus in accordance with claim 7 further including location means responsive to radar range and radar beam position representative signals for providing signals representative of microburst impact location.

10. An apparatus in accordance with claim 9 wherein said velocity means further provides signals representative of horizontal velocity of said meteorological scatterers, said horizontal velocity of said meteorological scatterers being equal to horizontal wind velocity, and said apparatus further includes:

spatial extent means coupled to said location means for estimating spatial extent of said vertical wind and for providing an enable signal when said spatial extent is approximately equal to a predetermined spatial extent;

gate means coupled to said velocity means, said location means and to receive said average radar reflectivity representative signals and responsive to said enabling signal from said spatial extent means for providing said vertical location representative signals, said vertical wind representative signals, said horizontal wind representative signals, and said average reflectivity representative signals to said predictor means.

11. An apparatus in accordance with claim 7 wherein said doppler spectrum parameters provided by said estimator means are average doppler velocity, spectral width, and spectrum skewness.

12. An apparatus in accordance with claim 7 wherein said plurality of radar beams are of number 3 having respective beamwidths $\theta_1$, $\theta_2$, and $\theta_3$, said beamwidths having the following relationships $$\frac{\sin \theta_1}{\sin \theta_2} = \frac{\sin \theta_2}{\sin \theta_3}$$

13. An apparatus in accordance with claim 7 wherein said surveillance means includes receiver means for providing I and Q components of radar return signals, said I component being in phase with a reference signal and said Q component being in quadrature with said reference signal and wherein said estimator means includes:

means coupled to receive said I and Q components of radar signal returns for providing an average of dot products of selected pairs of received radar signal returns, each pair having first and second signals, a dot product of a selected pair of radar signal returns being a sum of products of I components and Q components of signals in said selected pair;

means coupled to receive said I and Q components of radar signal returns for providing an average of cross products of said selected pairs of received radar signal returns, a cross product of a selected pair of radar signal returns being a sum of products formed by multiplying said I component of said first signal in said selected pair by said Q component of said second signal in said selected pair and multiplying said Q component of said first signal in said selected pair by said I component of said second signal in said selected pair;

means coupled to said dot product means and said cross product means and responsive to said average of dot products of a first set of selected pairs of doppler signal returns and said average of cross products of a second set of selected pairs of doppler signal returns for providing mean doppler velocity and doppler spectrum asymmetry; and means coupled to said dot product means and said cross product means and responsive to said average of cross products of said first set of selected pairs and said average of dot products of said second set of selected pairs for providing doppler velocity spectral width.

* * * * *